(12) United States Patent
Hartmann

(10) Patent No.: US 7,686,345 B2
(45) Date of Patent: Mar. 30, 2010

(54) PLUG-TYPE COUPLING COMPRISING A MOLDED SEALING RING AND VENTING MEANS

(75) Inventor: Harald Hartmann, Dornhirn (AT)

(73) Assignee: Henn GmbH & Co. KG., Dornhirn (AT)

( * ) Notice: Subject to any disclaimer, the term of this patent is extended or adjusted under 35 U.S.C. 154(b) by 840 days.

(21) Appl. No.: 11/366,836

(22) Filed: Mar. 3, 2006

(65) Prior Publication Data

US 2006/0202472 A1    Sep. 14, 2006

(30) Foreign Application Priority Data

Mar. 3, 2005   (DE) ..................... 10 2005 009 688

(51) Int. Cl.
*F16L 17/00* (2006.01)

(52) U.S. Cl. .................. 285/111; 285/110; 277/552

(58) Field of Classification Search .............. 285/95, 285/110, 111, 113, 305; 277/552
See application file for complete search history.

(56) References Cited

U.S. PATENT DOCUMENTS

| | | | | |
|---|---|---|---|---|
| 2,049,801 A | * | 8/1936 | Gage | 285/5 |
| 2,743,899 A | * | 5/1956 | Kinney | 277/626 |
| 2,962,314 A | * | 11/1960 | Rickard | 277/626 |
| 2,975,799 A | * | 3/1961 | Stilwell | 137/521 |
| 3,279,806 A | * | 10/1966 | Bialkowski | 277/647 |
| 3,315,970 A | * | 4/1967 | Holoway | 277/615 |
| 3,409,314 A | * | 11/1968 | Roe | 285/18 |
| 4,036,512 A | * | 7/1977 | Francis | 285/111 |
| 4,239,242 A | * | 12/1980 | Burns | 277/612 |
| 5,273,323 A | * | 12/1993 | Calmettes et al. | 285/321 |
| 5,411,298 A | * | 5/1995 | Pollack | 285/94 |
| 5,556,139 A | * | 9/1996 | Wilkins | 285/111 |
| 5,749,606 A | * | 5/1998 | Lu et al. | 285/86 |
| 5,855,399 A | * | 1/1999 | Profunser | 285/305 |
| 5,975,589 A | * | 11/1999 | Wilkins | 285/111 |
| 6,007,106 A | * | 12/1999 | Wilkins | 285/110 |
| 6,131,959 A | * | 10/2000 | Profunser | 285/256 |
| 6,454,273 B1 | * | 9/2002 | Kashima et al. | 277/437 |
| 7,229,102 B2 | * | 6/2007 | Kubala | 285/98 |

FOREIGN PATENT DOCUMENTS

| | | | |
|---|---|---|---|
| DE | 10136 250 A1 | | 10/2002 |
| EP | 1524465 A1 | * | 4/2005 |
| GB | 1 464 743 | | 2/1977 |
| WO | WO 2005046906 A1 | * | 5/2005 |
| WO | WO 2005/103550 A1 | | 11/2005 |
| WO | WO 2005103550 A1 | * | 11/2005 |
| WO | WO 2005103551 A1 | * | 11/2005 |
| WO | WO 2007045281 A1 | * | 4/2007 |

* cited by examiner

*Primary Examiner*—Aaaron M Dunwoody
(74) *Attorney, Agent, or Firm*—Browdy and Neimark, PLLC

(57) ABSTRACT

The plug-type coupling includes a molded sealing ring for producing liquid-tight or gas-tight connections, the plug-type coupling having a socket and a plug that can be axially plugged into each other, and the molded sealing ring being implemented as a lip seal disposed in a circumferential groove of the plug. The object is to further develop a plug-type coupling including a molded sealing ring of the above type in such a way that a pumping effect is prevented, in order to thus prevent a vacuum on the groove bottom during pulsating stresses on the plug-type coupling.

16 Claims, 5 Drawing Sheets

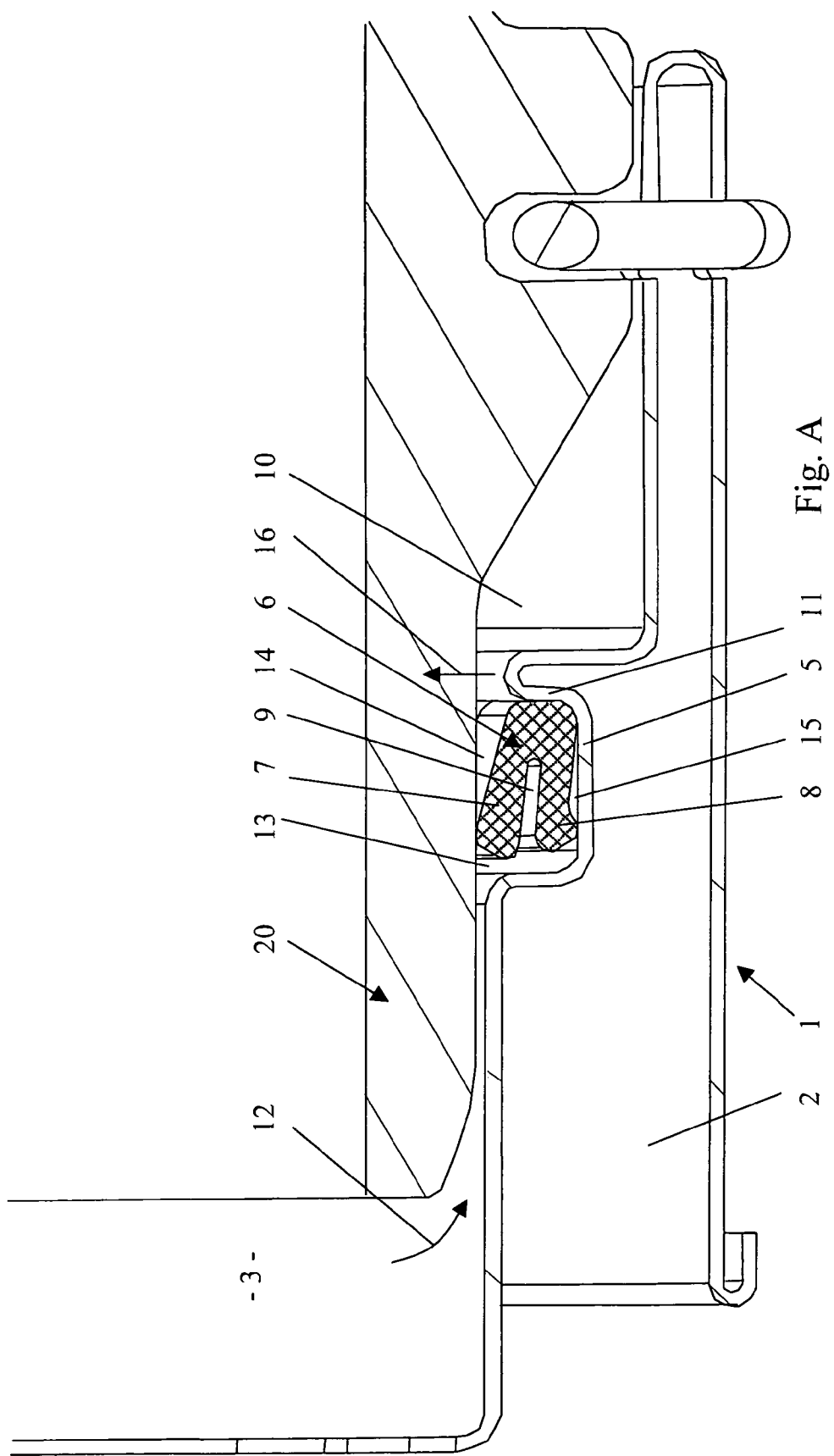
Fig. A

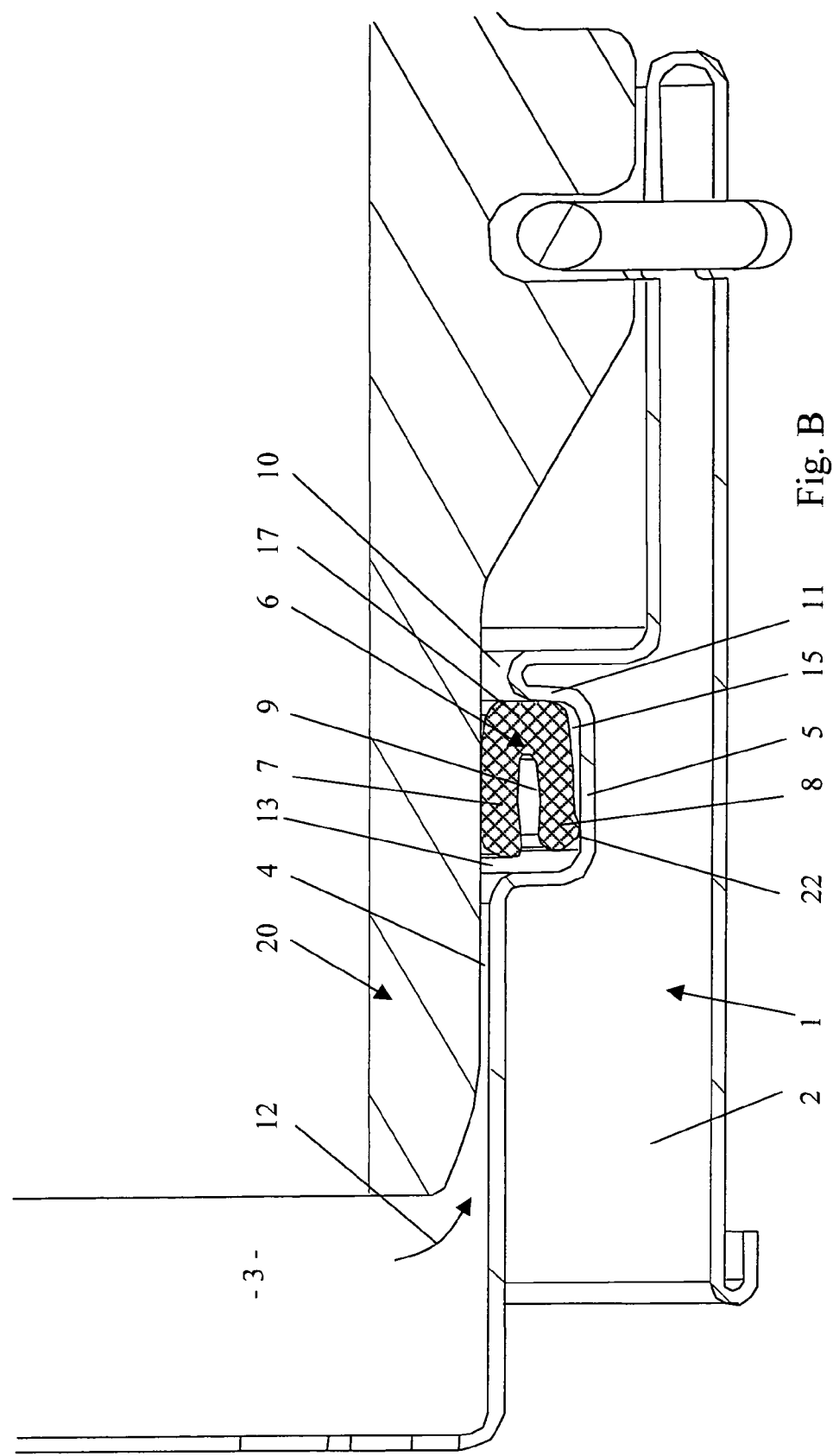
Fig. B

PLUG-TYPE COUPLING COMPRISING A MOLDED SEALING RING AND VENTING MEANS

The invention has as its object a plug-type coupling comprising a molded sealing ring and venting means.

BACKGROUND

1. Field

With respect to the action of a plug-type coupling and molded sealing ring used therewith, reference is made to the older patent application DE 10 2004 019 800.4 of the same applicant's.

2. Description of the Related Art

As prior art, reference is also made to DE 24 13 750 C2, which also describes a molded sealing ring as a two-element sealing ring in FIG. 5.

A molded sealing ring of this type is used preferably for plug-type couplings, since low plug-in forces exist. With plug-type couplings, however, the problem exists that the groove in the plug is shaped relatively inexact and, moreover, only a shallow groove depth exists, since the entire plug is implemented as a drawn part and, therefore; has only a shallow groove depth. This would be different if the groove were produced by machining.

Due to the use of a plug that is implemented as a sheet metal part, the shortcoming arises that relatively wide tolerances exist in the region of the seal connection between the plug and socket, since—as explained above—the plug preferably consists of a sheet metal part and the socket may consist of various different materials, such as, e.g., plastic, diecasting, and other metal materials. Moreover, it may be implemented as a turned part or a drawn part.

Because of the associated short axial guide length when connecting the plug-type coupling, a large angle play accordingly results as well.

For the above reasons, the use of a lip seal according to the subject matter of the above-mentioned older patent application has proven successful on a large scale.

It has turned out now that in the case of pulsating stresses on the plug-type coupling, during which pulsations within a range of −200 mbar to +4 bar overpressure can occur, an extraordinarily high stress can occur for the seal connection. In addition to these pressure surges, an additive relative movement between the socket and the plug occurs as well, placing great demands on the lip seal.

In the case of the design according to DE 24 13 750, a lip seal will work only in combination with a highly precisely formed groove, since the two legs of the lip seal adjoin the flanks of the groove in a virtually form-fitting manner and no free spaces are created in this manner. A given pulsating stress therefore does not produce any lift-off effect or displacement effect of the static leg of the lip seal, as may be the case with the above-mentioned plug-type coupling.

In the case of a plug-type coupling comprising a lip-seal ring according to the subject matter of the older patent application, pulsating stresses lead to a so-called pumping effect. In the process, the lip seal shifts with its base leg against the rear groove flank, thus attaining a sealing effect between the base leg of the C-shaped contoured lip seal and the groove flank.

At the same time, however, the dynamic sealing lip also inflates, thus creating a pulling effect on the dynamic leg and the base leg, and a vacuum develops on the groove bottom, because the base leg is lifted out of the groove along with the static leg.

The medium is now suctioned from the pressurized side into the hollow space that has been created in this manner, because the static leg gives way and the back and the base leg seal too tightly on the circumferential annular sealing flank of the groove.

As soon as the pressure is removed from the pressure chamber, the lip seal is pushed forward in the direction against the pressure load, causing the sealing effect on the groove flanks to be reduced, and the medium is released from the negative-pressure carrying hollow space into the ambient space.

This describes the above-mentioned pumping effect, which is intended to be prevented with the inventive features described below.

The invention, therefore, has as its object to improve a plug-type coupling comprising a molded sealing ring of the above type in such a way that the above-described pumping effect is prevented.

SUMMARY

To met the presented object, the invention is characterized by the technical teaching of claim 1.

An essential feature of the invention lies in that a pumping space that forms at the bottom of the groove during pulsating stresses on the plug-type coupling can be vented.

In a preferred embodiment of the invention, provision is made for the air-conducting connection to be implemented via a plurality of venting grooves disposed along the circumference of the lip seal.

In another embodiment provision is made, in lieu of the venting grooves that interrupt the sealing effect of the base leg, for a plurality of naps to be disposed on the base leg evenly distributed along the circumference and protruding beyond the outer circumference of the base leg, which produce between each other said air-conducting connections between the pumping space in the region of the groove of the plug and the ambient space.

In lieu of the arrangement of diameter-enlarging naps that protrude beyond the base leg, the equivalent measures may also be taken in a kinematic reversal in the region of the groove flank on the plug.

In this case, provision is made in a first embodiment for openings to be disposed evenly spaced in the plug along its circumference in the region of the groove flank, which also connect the pumping space of the plug groove to the ambient space.

In lieu of said openings, notches may be provided as well in the region of the circumferential groove flank, in order to thus also provide the air-conducting connection between the existing pumping space in the region of the groove of the plug and the ambient space.

The invention has the advantage that a C-shaped contoured ring is used as the lip seal, which has a lightweight, thin lip embodiment whereby low plug-in forces are created. For example, provision may be made for the thickness of the static leg to be three times the thickness of the dynamic leg.

In a further development of the invention, provision is made in the region of the static leg for an outwardly directed sealing bulge that sits against the groove bottom to be provided on the static leg. This creates a defined sealing edge.

An additional embodiment of the invention provides for the plug in the region of the developing pumping space to have a ventilation/venting bore through the body of the plug, which performs a continuous ventilation/venting of the developing pumping space.

It is also advantageous if a relatively thin base member is used that has approximately double the thickness of the dynamic leg.

The core of the invention thus lies in that ribs, notches, naps and similar geometries are present that create on the base leg of the C-shaped contoured lip seal an air-conducting connection between the pumping space and the ambient space, said pumping space developing on the outer circumference of the static leg in the direction towards the inner wall of the circumferential groove in the plug.

The given technical teaching, because of the use of a C-shaped contoured lip seal, creates the advantage of low plug-in forces.

This also permits inexact groove shapes with a shallow groove depth to be controlled, since special requirements for the groove geometry no longer exist due to the prevention of the pumping effect.

As a result, the production costs for a plug of this type are particularly low. It may be drawn from an inexpensive sheet metal material.

Large tolerances between the plug and socket can accordingly be bridged as well.

Moreover, a large angle play can exist between the axes of the plug and socket, which may be within a range of +/−5°.

Also, pulsating stresses of the medium in the range between −200 mbar to +4 bar overpressure can be sealed and easily controlled.

Because of the lightweight design of the seal, the material consumption is low as well.

The inventive subject of the present invention is derived not only from the subject matter of the individual patent claims, but also from the combination of the individual patent claims among each other.

All details and features revealed in the documentation, including in the abstract, especially the three-dimensional embodiment presented in the drawings, are claimed as essential to the invention to the extent that they are novel over the prior art, either individually or in combination with each other.

BRIEF DESCRIPTION OF THE DRAWINGS

The invention will be explained in more detail below based on drawings showing multiple embodiment approaches. Additional features essential to the invention and advantages of the invention will become apparent from the drawings and their description.

In the drawings:

Figure 1:
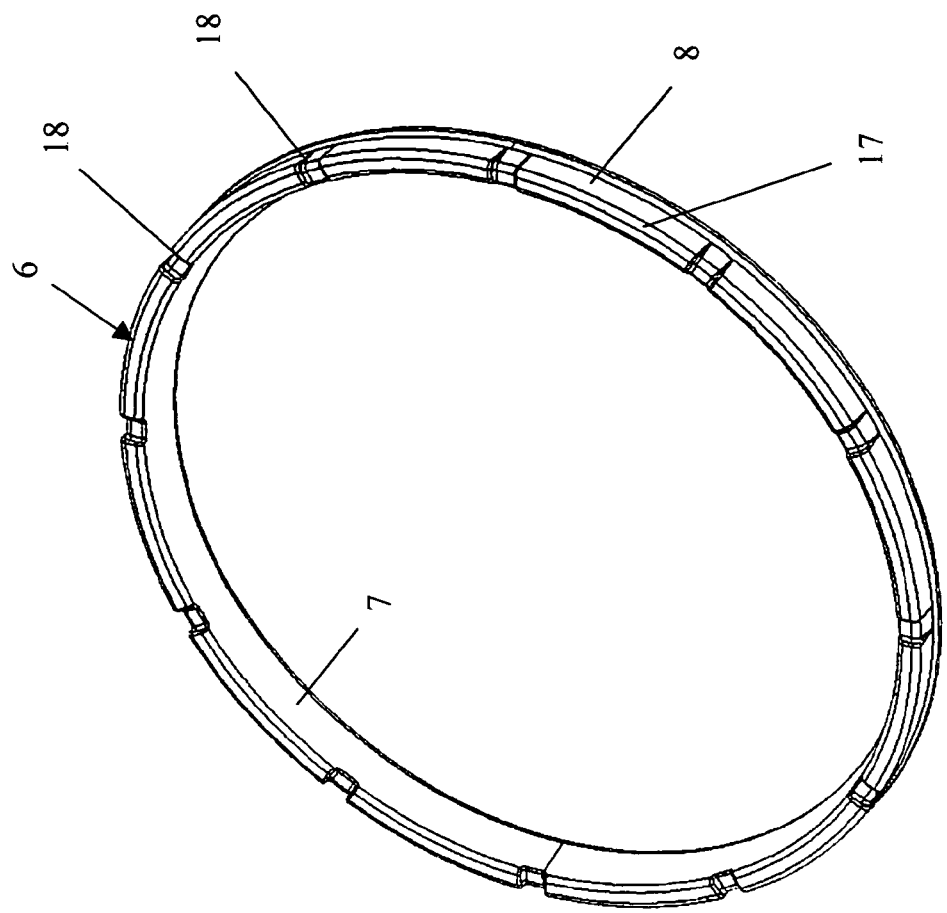
Figure 1A:
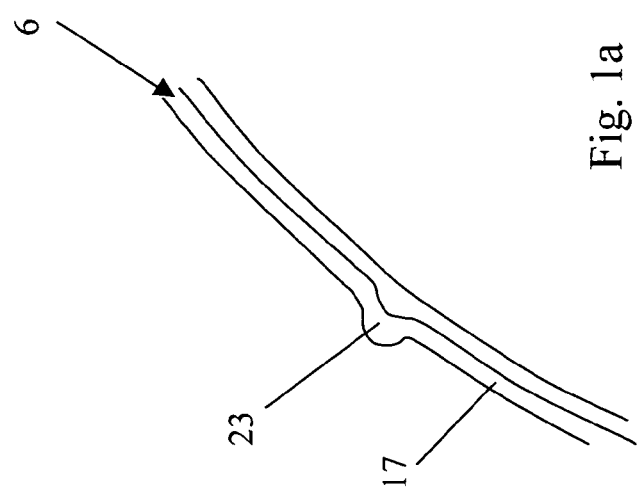
Figure 2:
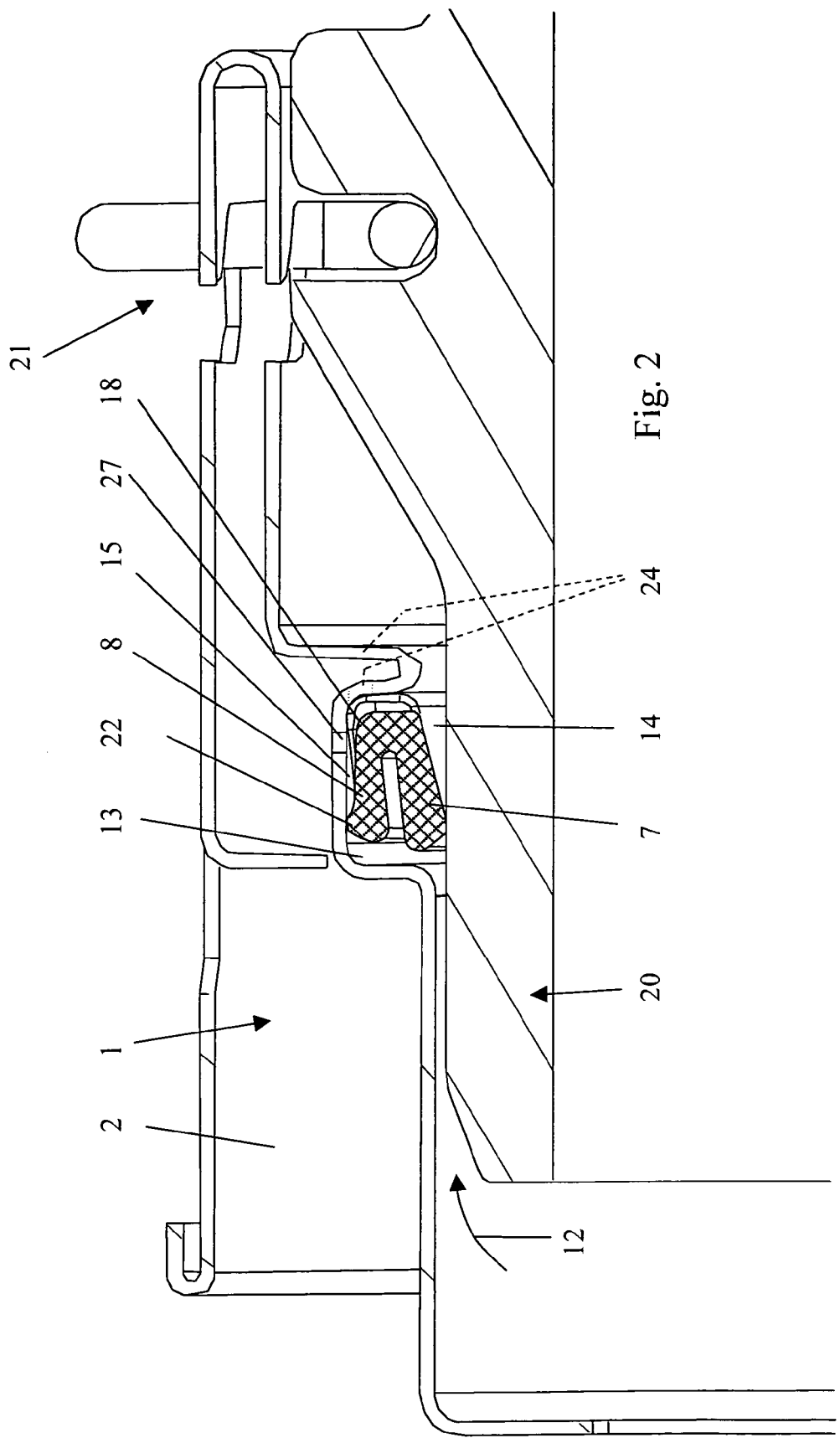

Figure A shows a plug-type coupling according to the older patent application in the unpressurized condition;

Figure B shows the plug-type coupling according to Figure A under pressure, with an illustration of the pumping effect;

FIG. 1 shows the perspective illustration of the inventive embodiment of a lip seal;

FIG. 1A shows an embodiment that has been modified from FIG. 1;

FIG. 2 shows the illustration of the inventive solution of a plug-type coupling in two different embodiments without the action of internal pressure;

FIG. 3 shows the embodiment according to FIG. 3, again in two different embodiments under the action of internal pressure.

DETAILED DESCRIPTION OF EXAMPLE EMBODIMENTS

First, the pumping effect shall be explained based on Figures A and B as it can occur in the case of a lip seal according to the older patent application.

Figure A shows a plug-type coupling according to the older patent application, comprising a plug 1, which is preferably implemented as a shaped sheet metal part. The plug 1 forms a circumferential interior space 2, which is taken up by tubing that is not shown here.

The not depicted tubing seals an interior space with a pressure medium 3, which acts upon the plug-type coupling in the direction of the arrow 12.

The counterpart to the plug 1 is created by a socket 20, and disposed in the space between the plug 1 and socket 20 is the novel lip seal 6.

To seal the plug 1 on the socket 20, a circumferential groove 5 is formed in the sheet metal material of the plug, in which said C-shaped lip seal 6 is embedded.

The lip seal 6 comprises a static leg 8 that is supported on the groove bottom in a sealing manner with a lower sealing bulge 22 disposed at its front end. The static leg 8 transitions via a base leg 17 into a dynamic leg 7, which also sits with its frontal free part against the inner circumference of the socket 20 in a sealing manner.

The pressure medium 3 thus acts upon the annular gap 4 in the direction of the arrow 12 and tends to "inflate" the lip seal.

In the transition between Figure A and Figure B, these conditions are shown.

It is visible that, due to the acting overpressure, the same enters into the annular gap 13 in front of the lip seal 6 and thus also exerts stress upon the space 9 between the legs 7, 8.

This causes the space 9 to be widened—due to the given rise in pressure—causing the dynamic leg 7 to move and sit against the inner circumference of the socket 20.

At the same time the static leg 8 rises from the groove bottom of the groove 5 and moves upward. This frees up a pumping space 15 because, on the opposite side, the dynamic leg 7 is displaced into the free space 14.

The pumping space 15, however, is sealed from the atmosphere in an undesirable manner, since the base leg 17 still sits in a sealing manner against the groove flank 11 of the groove 5 and therefore does not create any load release for the pumping space 15.

Even though the lip seal 6 was lifted upward with its base leg 17 in the direction of the arrow 16, the pumping space 15 thus remains closed in itself and because of this movement in the direction of the arrow 16, negative pressure is generated in the pumping space 15.

Since the seal on the groove flank 11 is greater than, by comparison, in the region of the frontal sealing bulge 22, the pressure medium is therefore suctioned into the negative-pressure carrying pumping space 15 in the direction of the arrow 12, surmounting the sealing bulge 22, where it is stored.

As soon as the pressure of the pressure medium 3 ceases, the lip seal 6 deforms in the opposite direction of the drawn-in arrow 16, additionally an axial movement takes place between the plug and the socket when the pressure of the pressure medium 3 ceases, resulting once more in the condition according to Figure A.

The pressure medium stored in the pumping space 15, however, is then removed from this pumping space 15 via the groove flank 11 in the direction toward the ambient space 10, which causes an undesirable leak.

This describes the pumping effect, which causes the pressure medium to be released into the ambient space 10 in small portions (drop by drop) via the undesired pumping effect.

The same conditions also apply, of course, if the pressure medium is not a liquid medium but a gaseous medium.

This is where the invention comes into play.

Figure 3:
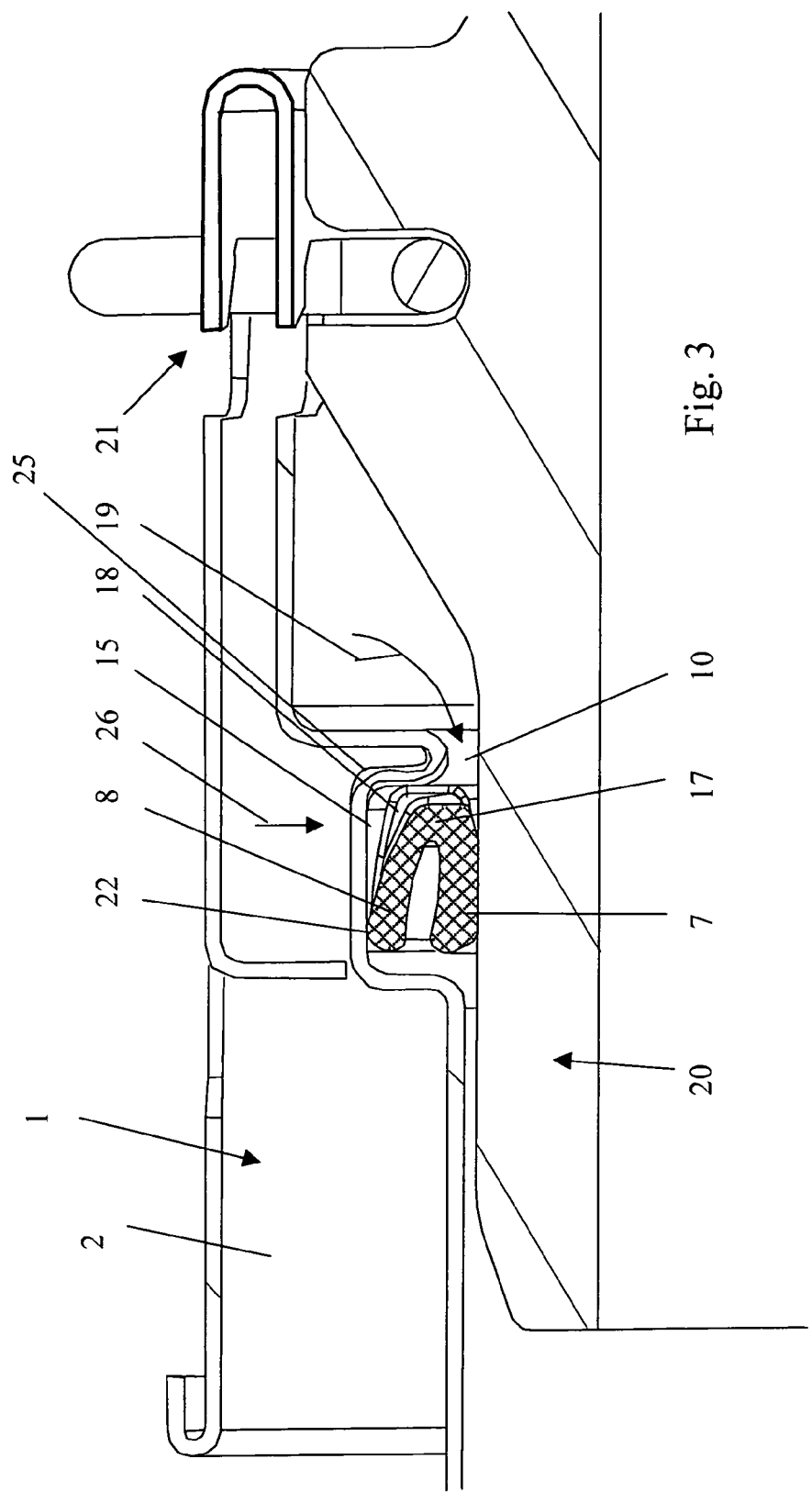

In the drawing examples of FIGS. 2 and 3, the detailed embodiment of the plug-type coupling is shown as explained based on Figures A and B. The same explanations and the same features therefore also apply to the embodiment according to the invention presented in FIGS. 1 through 3.

It is now an essential feature of the invention that, according to FIG. 1, the lip seal 6 incorporates, at least in the region of the base leg, venting grooves 18 facing in the radial direction that are distributed evenly spaced along the circumference, which interrupt the sealing adherence of the base leg 17 in the region of the groove flank 11 of the plug groove 5.

This action is explained in more detail based on FIGS. 2 and 3.

For ease of drawing, the mirrored position from the illustration in Figure A and B was now depicted, with the pumping space 15 now on top in the drawings of FIGS. 2 and 3. However, the same constructional correlations apply as before.

From the comparison between FIGS. 2 and 3 it is now apparent that in the case of an enlargement of the pumping space 15 in the transition between FIG. 2 and FIG. 3, a storing of the pressure medium in the pumping chamber is no longer possible, since the venting grooves 18 that are disposed in the base leg 17 of the lip seal 6, permit with [sic] a continuous air-conducting connection of the pumping chamber 15 in the direction toward the ambient space 10.[1]

[1] Translator's note: This translation is based on a sentence in the German-language document that is either incomplete or grammatically incorrect.

The pumping space 15 is thus always open in the direction toward the ambient space 10.

When the lip seal 6, due to the action of the pressure medium 3, now moves downward in the direction of the arrow 26 to open the pumping space, a pressure release of the medium takes place from the ambient space in the direction of the arrow 19.

As a further remark, it is hereby pointed out that the releasable connection between the plug 1 and socket 20 is formed by a snap-in locking device 21, which is the subject matter of many patent applications of the same applicant's. Reference is made to the descriptions of this snap-in locking device, which are prior art. The disclosure shall be fully encompassed by the present invention.

As an alternative embodiment, it is shown in FIG. 1A that in lieu of the venting grooves 18, so-called naps 23 may be provided as well, which protrude beyond the clear width of the base leg 17 and which, accordingly, represent a kinematic reversal of the above-mentioned venting grooves 18.

As an alternative feature, the venting measures may also be provided not or not only in the region of the lip seal 6, but may also be provided in the region of the groove flank 11.

To illustrate this, FIG. 2 shows in dashed lines a first embodiment, which illustrates that in the region of the groove flank 11, openings 24 may be provided in the axial direction, which also extend through the adjoining flank of the plug, in order to thus also permit an air-conducting connection to the ambient space 10.

To repeat once more, pressure-venting measures may be implemented, both, on only the lip seal 6 or in combination with the design modifications in the region of the groove flank 11.

FIG. 3 shows an additional embodiment of the design modification of the groove flank 11 that also meets the inventive technical teaching in combination with the venting of the lip seal or on its own.

There, it is shown that evenly distributed along the circumference in the region of the groove flank 11 are notches 25 which, accordingly, in this manner also produce an air-conducting connection between the pumping space 15 and the ambient space 10.

It is important, therefore, that the venting measures are variable within wide margins, in order to achieve that no sealing effect occurs between the base leg 17 and groove flank 11, to thus connect the pumping space 15 in an air-conducting manner to the ambient space 10.

Accordingly, holes, notches or ribs may be disposed on the groove flank 11 as well.

The sealing ring is composed of an elastomeric material, e.g., a rubber material, India-rubber, a polymeric plastic, and suchlike.

In the case of a nominal diameter of the plug-type coupling of 55 mm, the sealing ring has an axial length of only approximately 4.5 mm, a height of 4 to 4.5 mm in its uninstalled condition.

The thickness of the static leg in this case is maximally 2 mm, whereas the thickness of the dynamic leg is approximately 1 to 2 mm.

This results in the lightweight and space-saving construction of the lip seal that permits very low plug-in forces.

In a further development of the invention, provision may also be made for openings 27 to be evenly distributed along the circumference in the region of the groove bottom of the groove 5, to vent the pumping space 15.

An additional embodiment of the invention provides for the plug 1 to have, in the region of the developing pumping space 15, a ventilation/venting bore 28 that performs a continuous ventilation/venting of the developing pumping space 15.

DRAWING LEGEND

1 Plug
2 Interior space (tubing)
3 Pressure medium (interior space)
4 Annular gap
5 Groove
6 Lip seal
7 Leg (dynamic)
8 Leg (static)
9 Space
10 Ambient space
11 Groove flank
12 Direction of arrow
13 Annular gap
14 Free space
15 Pumping space
16 Direction of arrow
17 Base leg
18 Venting groove
19 Direction of arrow
20 Socket
21 Snap-in locking device
22 Sealing bulge
23 Nap 24 Opening (groove flank)
25 Notch (groove flank)
26 Direction of arrow
27 Opening
28 Ventilation/venting bore

What is claimed is:

1. A coupling comprising a molded sealing ring for producing liquid-tight or gas-tight connections,
    said coupling having a socket (20) and a plug (1) capable of being axially plugged into each other, and said molded sealing ring is implemented as a tip seal (6) disposed in a circumferential groove (5) of the plug (1),
    wherein a pumping space (15) that develops on the bottom of the groove (5) during pulsating stresses on the coupling is structured such that it is capable of being ventilated/vented;
    wherein a ventilation/venting means of the pumping space is implemented by an air-conducting connection between the pumping space (15) and an ambient space (10),
    wherein the air-conducting connection is implemented by a plurality of venting grooves (18) disposed and distributed along the circumference of the lip seal (6),
    wherein the lip seal (6) comprises two axial extending legs (7, 8) and a connecting radial extending base leg (17) between the two axial legs (7, 8), which incorporates venting groove (18) facing in the radial direction,
    wherein the venting grooves (18) interrupt the sealing adherence of a base leg (17) in the region of groove flank (11) of the plug groove (5) and permit the continuous air-conducting connection of the pumping chamber (15) in the direction toward the ambient space (10),
    wherein the pumping chamber (15) is defined between the lip seal (6) and the groove (5) of the plug (1) and the venting grooves (18) are distributed along an outer circumference of the base leg (17), which faces away from both axial legs (7, 8).

2. A coupling comprising a molded sealing ring according to claim 1, characterized in that, in lieu of the venting grooves (18) that interrupt the sealing effect of the base leg (17), a plurality of naps (23) are disposed on the base leg (17) evenly distributed along the circumference and protruding beyond the outer circumference of the base leg (17) and that air-conducting connections develop between the naps (23), between the pumping space (15) in the region of the groove (5) of the plug (1) and the ambient space (10).

3. A coupling comprising a molded sealing ring according to claim 2, characterized in that the groove (5) in the plug (1) has a groove flank (11), in the region of which equivalent measures are disposed in a kinematic reversal of the interrupting venting grooves (18) on the base leg (17).

4. A coupling comprising a molded sealing ring according to claim 3, characterized in that a first equivalent measure incorporates circumferential and evenly spaced openings in the plug (1) in the region of the groove flank (11) that connect the pumping space (15) of the groove (5) in the plug (1) to the ambient space (10).

5. A coupling comprising a molded sealing ring according to claim 4, characterized in that a second equivalent measure incorporates circumferential and evenly spaced notches (25) in the plug (1) in the region of the groove flank (11) that connect the pumping space (15) of the groove (5) in the plug (1) to the ambient space (10).

6. A coupling comprising a molded sealing ring according to claim 5, characterized in that the plug (1) has, in the region of the developing pumping space (15), a ventilation/venting bore (28).

7. A coupling comprising a molded sealing ring according to claim 6, characterized in that the lip seal (6) has a relatively thin main body, which preferably has double the thickness of the dynamic leg (7).

8. A coupling comprising a molded sealing ring according to claim 7, characterized in that the ribs (22), notches (25), naps (23) and similar geometries on the base leg (17) of the C-shaped contoured lip seal (6) create an air-conducting connection between the pumping space (15) and the ambient space (10).

9. A coupling comprising a molded sealing ring according to claim 8, characterized in that, to prevent the pumping effect, the groove (5) may have a relatively inexact shape with a shallow groove depth and no special requirements are placed on the groove geometry.

10. A coupling comprising a molded sealing ring according to claim 9, characterized in that the tolerance between the plug (1) and the socket is relatively large, whereby production costs are relatively low.

11. A coupling comprising a molded sealing ring according to claim 10, characterized in that the angle play between the axes of the plug (1) and the socket is relatively large.

12. A coupling comprising a molded sealing ring according to claim 11, characterized in that a relatively large stress region due to pulsating media is sealed whereby the lip seal (8) requires a relatively low material consumption.

13. A coupling comprising a molded sealing ring for producing liquid-tight or gas-tight connections,
    said coupling having a socket (20) and a plug (1) capable of being axially plugged into each other,
    wherein said molded sealing ring is implemented as a lip seal (6) disposed in a circumferential groove (5) of the plug (1),
    wherein a pumping space (15) that develops on the bottom of the groove (5) during pulsating stresses on the coupling is structured such that it is capable of being ventilated/vented;
    wherein a ventilation/venting means of the pumping space comprises an air-conducting connection between the pumping space (15) and an ambient space (10),
    wherein a plurality of naps (23) are disposed on a base leg (17) of the lip seal (6) and are evenly distributed along the circumference and protruding beyond the outer circumference of the base leg (17), and
    wherein the air-conducting connection develops between the naps (23), between the pumping space (15) in the region of the groove (5) of the plug (1) and the ambient space (10).

14. A coupling comprising a molded sealing ring for producing liquid-tight or gas-tight connections,
    said coupling having a socket (20) and a plug (1) capable of being axially plugged into each other, and said molded sealing ring is implemented as a lip seal (6) disposed in a circumferential groove (5) of the plug (1),
    wherein a pumping space (15) that develops on the bottom of the groove (5) during pulsating stresses on the coupling is structured such that it is capable of being ventilated/vented;
    wherein a ventilation/venting means of the pumping space is implemented by means of an air-conducting connection between the pumping space (15) and an ambient space (10), characterized in that the groove (5) in the plug (1) has a groove flank (11), in the region of which equivalent measures are disposed in a kinematic reversal of interrupting venting grooves (18) on a base leg (17) of the lip seal (6);

wherein circumferential and evenly spaced openings are incorporated in the plug (1) in the region of the groove flank (11) that connect the pumping space (15) of the groove (5) in the plug (1) to the ambient space (10).

15. A coupling comprising a molded sealing ring for producing liquid-tight or gas-tight connections, said coupling having a socket (20) and a plug (1) capable of being axially plugged into each other, and said molded sealing ring is implemented as a lip seal (6) disposed in a circumferential groove (5) of the plug (1), wherein a pumping space (15) that develops on the bottom of the groove (5) during pulsating stresses on the coupling is structured such that it is capable of being ventilated/vented;

wherein a ventilation/venting means of the pumping space is implemented by means of an air-conducting connection between the pumping space (15) and an ambient space (10), characterized in that the groove (5) in the plug (1) has a groove flank (11), in the region of which equivalent measures are disposed in a kinematic reversal of interrupting venting grooves (18) on a base leg (17) of the lip seal (6), wherein circumferential and evenly spaced notches (25) are incorporated in the plug (1) in the region of the groove flank (11) that connect the pumping space (15) of the groove (5) in the plug (1) to the ambient space (10).

16. A coupling comprising a molded sealing ring for producing liquid-tight or gas-tight connections, said coupling having a socket (20) and a plug (1) capable of being axially plugged into each other, and said molded sealing ring is implemented as a lip seal (6) disposed in a circumferential groove (5) of the plug (1), wherein a pumping space (15) that develops on the bottom of the groove (5) during pulsating stresses on the coupling is structured such that it is capable of being ventilated/vented;

wherein a ventilation/venting means of the pumping space is implemented by means of an air-conducting connection between the pumping space (15) and an ambient space (10), characterized in that the plug (1) has, in the region of the developing pumping space (15), a ventilation/venting bore (28).

* * * * *